United States Patent [19]

Kommrusch et al.

[11] Patent Number: 5,539,473
[45] Date of Patent: Jul. 23, 1996

[54] DOT CLOCK GENERATION WITH MINIMAL CLOCK SKEW

[75] Inventors: Steven J. Kommrusch; Bradly J. Foster, both of Ft. Collins, Colo.

[73] Assignee: Hewlett-Packard Company, Palo Alto, Calif.

[21] Appl. No.: 543,229

[22] Filed: Oct. 13, 1995

Related U.S. Application Data

[63] Continuation of Ser. No. 221,155, Mar. 31, 1994, abandoned.

[51] Int. Cl.$^6$ .................................................... H04N 5/04
[52] U.S. Cl. ............................................ 348/537; 348/536
[58] Field of Search ................................. 348/536, 537, 348/538, 539, 540, 572, 573, 574; 375/362, 364, 373, 371, 375, 376; 358/158, 148, 13; H04N 7/13, 5/04, 5/05, 7/56, 7/54, 7/24

[56] References Cited

U.S. PATENT DOCUMENTS 4,774,577  9/1988  Takimoto ............................ 348/537
4,791,488  12/1988  Fukazawa et al. ................. 348/537

Primary Examiner—David E. Harvey

[57] ABSTRACT

A dot clock generation system has a voltage-controlled oscillator (VCO) for generating a dot clock signal for an analog-to-digital convertor (ADC). A dot clock synchronization (sync) generator counts cycles of the dot clock signal and generates a dot clock sync signal. An analog video signal is passed through a first differential buffer to create an analog video sync signal. The analog video sync signal is passed through a first flip-flop storage element to a phase detector. The dot clock sync signal is passed through a second storage element and then through a second differential buffer to the phase detector. The second storage buffer insures that the edge of the dot clock sync signal which is used by the phase detector is tightly tied with the sampling edge of the dot clock signal which is used by the ADC to sample the analog data within the analog video signal. Moreover, the first and second buffers and storage elements introduce similar propagation time delays into the analog video sync signal and the dot clock sync signal. Accordingly, the phase detector accurately compares the phases of these sync signals and generates a highly accurate voltage control signal for the voltage-controlled oscillator, thereby resulting in a high precision dot clock signal.

7 Claims, 4 Drawing Sheets

DOT CLOCK GENERATION WITH MINIMAL CLOCK SKEW

CROSS REFERENCE TO RELATED APPLICATION(S)

This is a continuation of application Ser. No. 08/221,155 filed on Mar. 31, 1994, now abandoned.

FIELD OF THE INVENTION

The present invention generally relates to processing of video signals, and more particularly, to a dot clock generation system and method for more accurately generating a dot clock signal for picture elements (pixels) from an analog video signal using a phase locked loop.

BACKGROUND OF THE INVENTION

A typical analog video signal 11 for driving an analog video display is illustrated in FIG. 1. As shown in FIG. 1, the analog video signal 11 is a composite signal having lines of analog data signal 12 combined with other sweep and synchronization (sync) signals, which include a blank level 14, having a front porch 14a and a back porch 14b, and a sync level 16. A blank period 14' is defined as a time period when the analog video signal 11 exhibits the front porch 14a, the sync level 16, and the back porch 14b, and a sync period 16' is defined as the time period in which the analog video signal 11 exhibits the sync level 16. The front porch 14a essentially cues the electron beam associated with a raster display to turn off when the beam sweeps from the end of a scan line to the beginning of the next scan line. The sync level 16 cues the electron beam to change either a scan line or a frame, depending upon its time period, and/or to reset counters and other support circuitry. When the sync level 16 cues a scan line, then it is referred to as a "horizontal sync" (Hsync). When the sync level 16 cues a frame, i.e., when it exhibits an extended time period, then it is referred to as a "vertical sync" (Vsync). Furthermore, the back porch 14b permits initialization of the electron beam and other support circuitry prior to acting upon a new scan line or frame.

If the analog video display is multicolor, then there would generally be one of the analog video signals 11 allocated to each color, such as for red, green, and blue. However, only one of the analog video signals, for instance, the one allocated to green, usually has the sync levels 16.

Recently, there has been a trend in the industry toward developing video displays which are driven by digital pixel data as opposed to analog video signals. An example of such a digital video display is the model LQ12D011TFT LCD flat panel display manufactured and made commercially available by the Sharp Corporation, Japan. Thus, it has recently been desirable to convert the analog video signal 11 of FIG. 1 into digital pixel data for driving a digitally-controlled display. This process can be described graphically with reference to FIG. 1. Referring to FIG. 1, in the process of converting the analog video signal 11 into digital pixel data, the analog data signal 12 is converted to a series of digital codes, depending upon its amplitude at a given point in time. For Sharp's digital display device, the analog data signal 12, which typically represents 256 different intensity levels for a particular color when the analog video signal 11 complies with the RS343A industry standard, must be converted to only 8 intensity levels, as is represented in FIG. 1 by levels 0 through 7. The lowest possible color intensity level is commonly referred to as the "black" level, whereas the highest possible color intensity level is commonly referred to as the "white" level.

In order to convert the analog data signal 12 to digital pixel data, i.e., a series of digital codes, a dot (pixel) clock signal must be generated and synchronized with the original dot clock which created the analog video signal 11. Typically, the dot clock signal is generated with a dot clock generation system 17, as is illustrated in FIG. 2, which employs a phase locked loop (PLL) 19. As shown on FIG. 2, the analog video signal 11 on connection 13 is converted into digital pixel data on connection 15, which is essentially a series of digital codes, or bytes, via an analog-to-digital converter (ADC) 14. Moreover, the ADC 14 is clocked by the dot clock signal on connection 18 from the phase locked loop 19. The phase locked loop 19 comprises an analog video sync separator 21 for generating an analog video sync signal on connection 22 indicative of the presence of sync levels 16 (FIG. 1), a voltage-controlled oscillator (VCO) 23 for generating the dot clock signal on connection 18, a dot clock sync generator 24 for converting the dot clock signal on connection 18 into a dot clock sync signal on connection 25, a phase detector 26 for comparing the phases of the analog video sync signal on connection 22 and the dot clock sync signal on connection 25 and for generating a up and down phase control signals on respective connections 28a, 28b, and a loop filter 27 for receiving the control signals on connections 28a, 28b and for providing a voltage control signal on connection 31 to the VCO 23 in order to increase and decrease the frequency of the dot clock signal on connection 18 output from the VCO 23. In essence, the loop filter 27 converts the control signals on connections 28a, 28b into a voltage amplitude for controlling the VCO 23. Generally, a higher absolute voltage corresponds to a higher absolute frequency. Finally, there is usually an adjustment mechanism associated with the PLL 19, such as with the VCO 23, the phase detector 26, or the loop filter 27, for tuning the PLL 19 so that the dot clock sync signal is matched with the analog video sync signal.

The general operation of the dot clock generation system 17 is as follows. Initially, the VCO 23 is a free running oscillator. The analog video signal 11 is sent to the analog video sync separator 21 which separates out the sync levels 18 from the analog video signal 11 by eliminating any part of the analog video signal 11 above the blank level 14. The resultant analog video sync signal on connection 22 is compared with the dot clock sync signal on connection 25 by the phase detector 26. If the edge (rising or falling) of the analog video sync signal on connection 22 is ahead of the edge of the dot clock sync signal on connection 25, then the phase detector 26 causes the VCO 23 to increase the frequency of the dot clock signal on connection 18 via the up control signal on connection 27a. In the alternative, if the edge of the analog video sync signal on connection 22 is behind the dot clock sync signal on connection 25, then the phase detector 26 will cause the VCO 23 to decrease the frequency of the dot clock signal on connection 18 via the down control signal on connection 27b. Accordingly, the dot clock synch signal on connection 25 will eventually correspond with the analog video sync signal on connection 22, and consequently, the dot clock signal on connection 18 will correspond with the dot clock which created the analog data signal on connection 12 in the analog video signal 11. The dot clock signal on connection 18 can then be used to clock the ADC 14 so that the analog video signal 11 is converted to the digital pixel data 15.

The prior arts dot clock generation systems, as exemplified by the system 17 in FIG. 2, do not provide for accurate generation of the dot clock signal on connection 18. One reason is that the analog video sync separator 21 introduces a certain level of propagation delay to the analog video sync signal on connection 22, which delay is non introduced into the dot clock sync signal on connection 25. Hence, the dot clock sync signal on connection 25 is synchronized by the phase locked loop with an analog video sync signal on connection 22 which does not accurately reflect occurrences of the sync levels 16 within the analog video signal 11. Consequently, the dot clock signal on connection 18 will be skewed slightly from the dot clock which generated the analog data signal 12 within the analog video signal 11.

FIG. 3 graphically illustrates digital-to-analog conversion within the ADC 14 when the dot clock signal on connection 18 is skewed in relationship to the analog data signal 12. The dot clock signal on connection 18 can be skewed in terms of frequency and/or phase (more common). Specifically, as shown in FIG. 3, the analog data 12, which resides between sync and blank levels 14, 16, comprises numerous discrete level regions 29 corresponding to a color value which represents the output from a digital-to-analog converter (DAC) clocked by an original dot clock signal. By way of example the dot clock signal on connection 18 is assumed to be skewed in terms of both frequency and phase with respect to the analog data 12. Because of the skew, the dot clock signal on connection 18 will cause the ADC 14 to sample the analog data 12 at locations 32, which are not necessarily within the level regions 29. This predicament results in inaccurate sampling of color data as well as the elimination of much of the color information. More specifically, as shown in FIG. 3, the sampling at location 1 shows that the digital pixel data 15 will be based upon the amplitude of the analog data 12 situated between level regions 29 as opposed to within a level region 29. Moreover, the level region 34 is effectively skipped by the ADC 14 as a result of the skewed dot clock signal on connection 18.

It should be further noted than conventional systems and 15 processes for converting analog television signals into digital pixel data for memory storage or display are not applicable to the processing of the analog video signal 11 for input to a digitized display. The reason is that the television signals are inherently analog. The ADC's in these conventional systems merely sample the analog television signals at any desired pixel rate and phase. Moreover, pixel sampling errors do not result because the television signals were not originally generated from a dot clock and do not exhibit the level regions 29 (FIG. 3).

SUMMARY OF THE INVENTION

Therefore, an object of the present invention is to overcome the deficiencies and inadequacies of the prior art as noted above and as generally known in the industry.

Another object of the present invention is to provide a system and method for more accurately generating a dot clock signal for pixels from an analog video signal.

Another object of the present invention is to provide a system and method for minimizing clock skew between a dot clock signal regenerated from an incoming analog video signal and an original dot clock signal used to create the analog video signal.

Another object of the present invention is to provide a system and method for minimizing propagation uncertainties and delay mismatch within a phase locked loop used to generate a dot clock signal from an analog video signal.

Another object of the present invention is to provide a system and method for accurately generating a dot clock signal from an analog video signal which was created from a high frequency dot clock signal.

Briefly described, the present invention is a dot clock generation system and method. The system has a variable frequency oscillator, preferably a voltage-controlled oscillator (VCO), for generating a dot clock signal for an analog-to-digital convertor (ADC). A dot clock synchronization (sync) generator counts cycles of the dot clock signal and generates a dot clock sync signal. An analog video signal is passed through a first differential buffer to create an analog video sync signal. The analog video sync signal is passed through a first flip-flop storage element to a phase detector. The dot clock sync signal is passed through a second storage element and then through a second differential buffer to the phase detector. The second differential buffer insures that the edge of the dot clock sync signal which is used by the phase detector is tightly tied with the sampling edge of the dot clock signal which is used by the ADC to sample the analog data within the analog video signal. Moreover, the first and second buffers and storage elements introduces similar propagation time delays into the analog video sync signal and the dot clock sync signal. Preferably, the first and second buffers reside on a single integrated circuit, preferably in close proximity on the same substrate, and the first and second storage elements reside on a single integrated circuit, preferably in close proximity on the same substrate. Hence, the phase detector accurately compares the phases of these sync signals and generates a highly accurate voltage control signal for the voltage-controlled oscillator, thereby resulting an a high precision dot clock signal.

The present invention can also be conceptualized as a method for more accurately generating a dot clock signal for pixels from an analog video signal using a phase locked loop. The method comprises the following steps: generating the dot clock signal with an oscillator; generating a dot clock synchronization signal from the dot clock signal; passing the analog video signal through a differential buffer to generate an analog video synchronization signal having a particular propagation time delay; introducing the particular propagation time delay in the dot clock synchronization signal by passing the dot clock synchronization signal through another buffer: comparing phases corresponding with the analog video synchronization signal and the dot clock synchronization signal after the particular time delay has been introduced in order to generate an oscillator control signal; and controlling the oscillator with the oscillator control signal so that the phases converge toward one another. In addition, the following steps can be added: passing the dot clock synchronization signal through a first storage element prior to passing the doe clock synchronization signal through the differential buffer; passing the analog video synchronization signal through a second storage element; and introducing similar propagation time delays in the dot clock synchronization signal and the analog video synchronization signal with the first and second storage elements.

In addition to accomplishing all of the objects as noted previously, the present invention further provides for the following additional advantages. For example, the present invention can be used to generate a dot clock from an analog video signal at frequencies greater than 100 megahertz (MHz).

Another advantage of the present invention is that it is simple in design, inexpensive to manufacture, and reliable in operation.

Another advantage of the present invention is that it does not require any adjustments or tuning, as with many prior art embodiments.

Other objects, features and advantages of the present invention will become apparent to one of skill in the art upon examination of the following drawings and detailed description. All such additional objects, features, and advantages are intended to be included herein.

BRIEF DESCRIPTION OF THE DRAWINGS

The present invention can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 4:
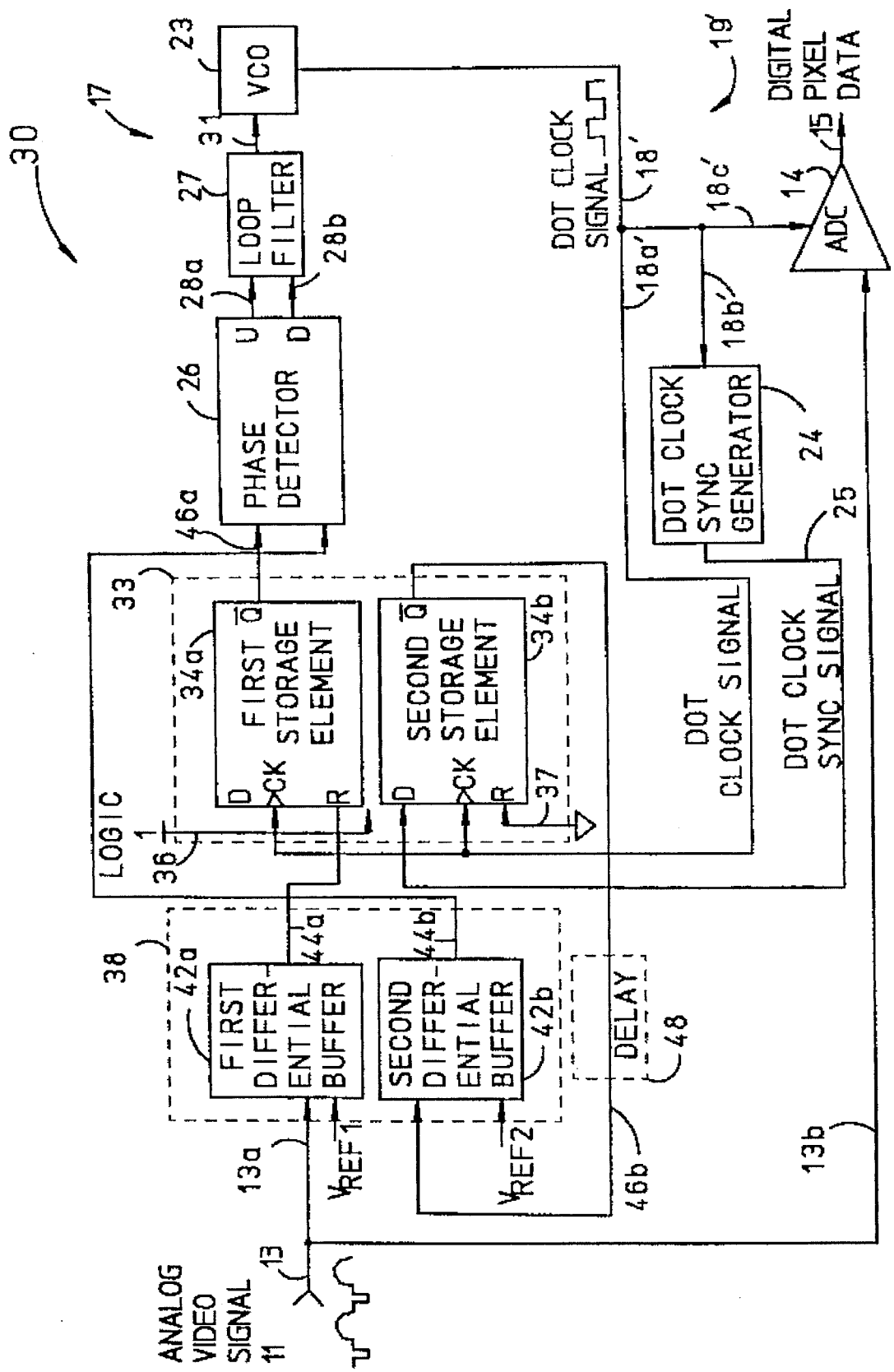
FIG. 4 is a schematic circuit diagram of the novel dot clock generation system and method in accordance with the present invention for more accurately generating a dot clock signal from the analog video signal of FIG. 1.

With reference now to the drawings wherein like reference numerals designate corresponding parts throughout the several views, FIG. 4 illustrates a dot clock generation system 30 and associated methodology in accordance with the present invention for accurately generating a dot clock signal on connection 18' from the analog video signal 11 so that digital pixel data 15 can be sampled and produced with high precision in relationship to the analog video signal 11. The analog video signal 11 may be a truly analog signal or one which has been generated by a digital-to-analog convertor with an original dot clock.

As illustrated in FIG. 4, the dot clock generation system 30 comprises a phase locked loop 19'. The phase locked loop 19' has a variable frequency oscillator 23. Preferably a voltage-controlled oscillator (VCO), such as a model 12148 integrated circuit oscillator manufactured and made commercially available by the Motorola Corporation, U.S.A., for generating the dot clock signal on connection 18'. The dot clock signal on connection 18' is sent to the analog-to-digital converter (ADC) 14 for causing the ADC 14 to sample and convert the analog video signal 11 to the digital pixel data 15. A dot clock sync generator 24 also receives the dot clock signal on connection 18'. The dot clock sync generator 24 generally counts cycles (either the rising or falling edges) of the dot clock signal on connection 18' and produces the dot clock sync signal on connection 25 after a particular number of cycles has been counted. In the preferred embodiment the dot clock sync generator 24 counts 1344 edges for each logic state change in the dot clock sync signal on connection 25. In architecture, the dot clock sync generator 24 is preferably implemented as a set of counters in combination with control logic situated within, perhaps, a programmable array logic (PAL).

The phase locked loop 19' further comprises a first storage element 34a and a second storage element 34b. The second storage element 34b guarantees that the edge of the dot clock sync signal which is used by the PLL 19' to generate the dot clock signal on connection 18' is tightly tied, or aligned with, the edge of the dot clock signal which ultimately samples the analog data signal 12 in the ADC 14. The second storage element 34b introduces a certain amount of propagation time delay into the dot clock sync signal. In order to provide for accurate comparison of phases, the analog video sync signal is passed through the first storage element 34a, which has preferably the same propagation time delay as the second storage element 34a. To this end, the first and second storage elements 34a, 34b are implemented on the same integrated circuit 33, preferably in close proximity on the same substrate, so that the propagation delays contributed to data passing through the respective storage elements 34a, 34b is essentially identical. Furthermore, suitable first and second storage elements 34a, 34b are D-type flip-flop mechanisms within a model 10E131 integrated circuit manufactured and made commercially available by the Motorola Corporation, U.S.A. The structure and functionality of D-type flip-flop mechanisms are well known in the art. They generally have a data input (D), a reset input (R), a data output (Q), an inverse data output (not Q), and a clock input (CK).

The data input of the first storage element 34a is connected to a logic high (in Boolean logic, a "1") on connection 36. The reset input of the first storage element 34a receives an analog video sync signal on connection 44a as will be further described hereafter. Moreover, the clock input is connected to the dot clock signal on connection 18a'. As for the second storage element 34b, the data input receives the dot clock sync signal on connection 25. The reset input of the second storage element 34b is connected to ground as designated by reference numeral 37. Moreover, the clock input of the second storage element 34b is connected to the dot clock signal on connection 18a'.

Figure 1:
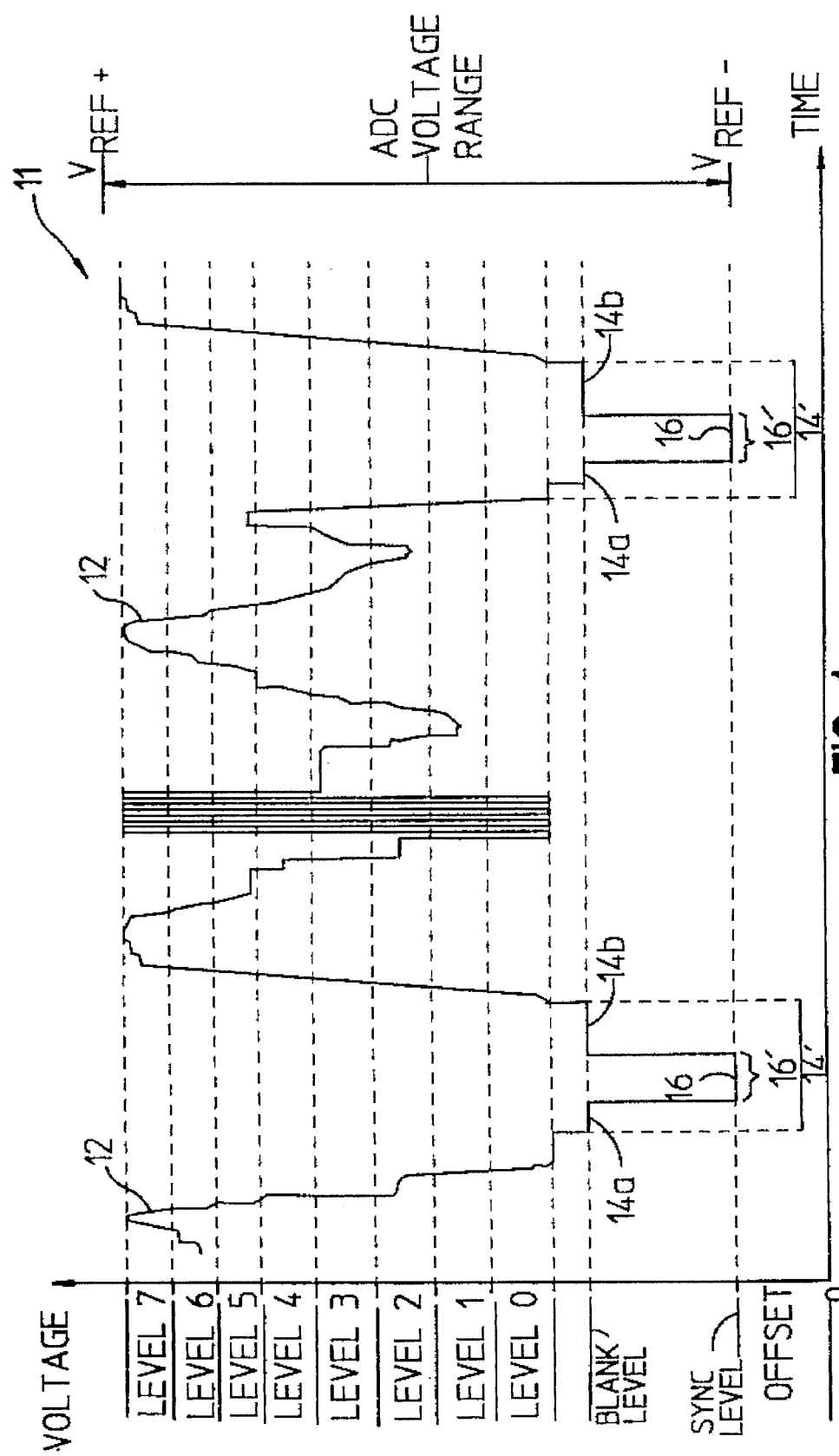
FIG. 1 is a graph illustrating a typical analog video signal with analog data as well as blank and synchronization levels.
Figure 2:
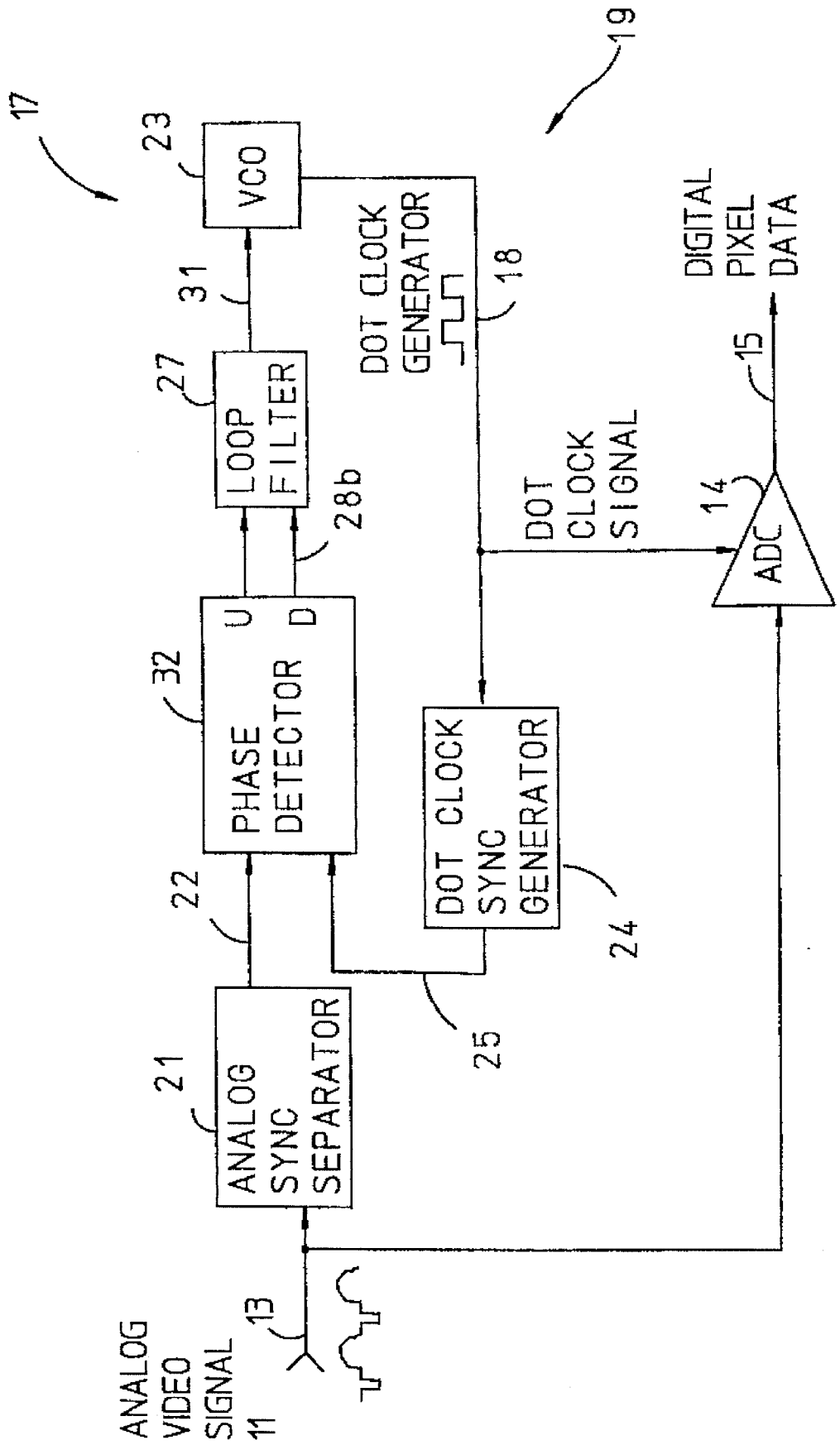
FIG. 2 is a schematic circuit diagram of a prior art dot clock generation system employing a phase locked loop for generating a dot clock signal in order to convert the analog video signal in FIG. 1 to digital pixel data.

A first differential buffer 42a and a second differential buffer 42b are also situated in the phase locked loop 19' as shown in FIG. 4. The first and second differential buffers 42a, 42b generally perform voltage comparisons at their respective inputs. Specifically, as illustrated in FIG. 4, the first differential buffer 42a compares the incoming analog video signal 11 on connection 13a to a first reference voltage $V_{REF1}$ in order to derive a logic state on output connection 44a. The first reference voltage $V_{REF1}$ is selected to pick out the sync levels (FIG. 1) within the incoming analog video signal on line 13a. In the preferred embodiment, the sync levels 16 of the analog video signal are dynamically clamped to about 3.7 volts with any suitable mechanism, a number of which are well known in the art, and the first reference voltage $V_{REF1}$ is set at approximately 3.8 volts. Thus, when the voltage level of the analog video signal 11 descends below the first reference voltage $V_{REF1}$ of about 3.8 volts, a sync is asserted in the analog video sync signal on connection 44a. The analog video sync signal on connection 44a is communicated to the reset input on the first storage element 34a.

Similarly, the second differential buffer 42b compares the incoming dot clock signal on connection 46b to a second reference voltage $V_{REF2}$ in order to derive a logic state on its respective output connection 44b. The second differential buffer 42b is connected to the data output (Q), as indicated by reference numeral 46b, from the second storage element 34b. However, the second reference voltage $V_{REF2}$ is selected so that the dot clock sync signal on connection 46b merely passes through the device without modification. In the preferred embodiment, the second reference voltage $V_{REF2}$ is set at about 3.7 volts, which is at the center of the logic voltage range of emitter coupled logic (ECL), i.e., the range from 3.3 to 4.0 volts. In essence, the important reason for including the second differential buffer 42b in the PLL 19' is to help further match the propagation time delays of the analog video sync signal and the dot clock sync signal so that an accurate comparison can take place. Therefore, because the analog video signal 11 must pass through the first differential buffer 42a in order to create the analog sync signal, the dot clock sync signal is passed through the second differential buffer 42b. Moreover, the propagation time delays of the first and second differential buffers 42a, 42b are preferably matched.

In order to match the propagation time delays, the first and second differential buffers 42a, 42b are situated on a single integrated circuit 38, preferably in close proximity on the same substrate. A model 10E416 integrated circuit manufactured and made commercially available by the Motorola Corporation, U.S.A, provides for suitable differential buffers 42a, 42b in the present invention.

A phase detector 26 comprises first and second inputs, which are compared, and an up output (U) 28a and a down output (D) 28b. Preferably, the phase detector 26 is a model 12140 phase detector manufactured and made commercially available by the Motorola Corporation, U.S.A. The first input is connected to the inverse output (not Q) of the first storage element 34a via connection 46a. The second input of the phase detector 26 is connected to the second differential buffer 42b via connection 44b. The phase detector 26 compares the phases of the first and second inputs, that is, the analog video sync signal from the inverse data output 46a and the dot clock sync signal from connection 44b, in order to ultimately drive up or down the frequency of the dot clock signal on connection 18'.

More specifically, if the edge (either rising or falling, but rising in the preferred embodiment) of the analog video sync signal from the inverse data output 46a is ahead of the edge (either rising or falling, but rising in the preferred embodiment) of the dot clock sync signal from connection 44b, then the phase detector 26 generates an appropriate logic state for the up control signal on connection 28a so that the loop filter 27 causes the VCO 23 to increase the frequency of the dot clock 18' In the alternative, if the edge of the analog sync signal is behind the corresponding edge of the dot clock sync signal, then the phase detector 26 generates an appropriate logic state for the down control signal on connection 28b so that the loop filter 27 causes the VCO 23 to decrease the frequency of the dot clock signal on connection 18'. Preferably, the loop filter 27 generates the VCO control signal on connection 31 to the VCO 23 by integrating the up control signal on connection 28a and subtracting therefrom the integration of the down control signal on connection 28b.

The propagation time delays described previously relative to the buffers 42a, 42b and the elements 34a, 34b result in very accurate comparison of phases at the phase detector 26. As mentioned, the first differential buffer 42a introduces a certain amount of propagation delay into the analog video signal 11 and consequently the analog video sync signal on connection 44a. Further, the second differential buffer 42a introduces generally the same certain amount of propagation time delay into the dot clock sync signal from connection 25. Similarly, the first storage element 34a introduces a particular amount of propagation time delay into the analog video sync signal from connection 44a. Moreover, the second storage element 34b introduces this particular amount of propagation time delay into the dot clock sync signal from connection 25. Accordingly, both the analog video signal 11 and the dot clock signal on connection 25 exhibit the same amount of propagation delay, and they can be accurately compared and synchronized by the phase detector 26.

In addition, it may be desirable to implement a propagation delay element 48 in the connection 46b from the second storage element 34b to the second differential buffer 42b so as to match; or fine tune, the propagation time delays of the dot clock sync signal and the incoming analog video sync signal prior to comparing their respective phases in the phase detector 26. This feature can be accomplished by, for example; implementing the connection 46b as a long printed circuit board trace of any desirable length.

OPERATION

The operation of the dot clock generation system 30 is as follows. The analog video signal 11 is received by the dot clock generation system 30 and is passed concurrently to the first differential buffer 42a and the ADC 14. Initially, the VCO 23 is a free running oscillator with an unsynchronized dot clock signal oscillating on connection 18' The first differential buffer 42a processes the analog video signal 11 and generates an analog video sync signal on connection 44a, which is passed to the reset input of the first storage element 34a. The first storage element 34a immediately passes the analog video sync signal to the phase detector 26 without waiting for an appropriate clocking signal from the dot clock signal on connection 18' said another way, the analog video sync signal on connection 44a is passed through the first storage element 34a asynchronously to the dot clock signal on connection 18'.

As the VCO 23 generates a dot clock signal on connection 18', the dot clock sync generator 24 produces the dot clock sync signal on connection 25 by counting dot clock cycles, which is passed to the data input of the second storage element 34b. The dot clock signal is passed to the output of the second storage element 34b only when the dot clock signal on connection 18' clocks the second storage element 34b. This insures that the edge of the dot clock sync signal which is used by the PLL 19' to generate the dot clock signal on connection 18' is tightly tied the sampling edge of the dot clock signal which ultimately samples the analog data signal 12 in the ADC 14.

After the dot clock signal on connection 18' clocks the second storage element 34b, the dot clock sync signal is passed to the second differential buffer 42b, as is indicated by the reference arrow 46b. The dot clock sync signal on connection 25 is passed through the second differential buffer 42b, and at the same time, the second differential buffer 42b introduces the certain amount of propagation delay corresponding with the differential buffer mechanism 38.

As the analog video signal 11 is passed through the first differential buffer 42a, the first differential buffer 42a introduces the certain amount of propagation delay associated with the differential buffer mechanism 38 to the analog video sync signal on connection 44a. Moreover, the analog video sync signal on connection 44a is passed onto the first storage element 34a, which introduces the particular amount of propagation delay associated with the storage element mechanism 33. The phase detector 26 then compares the phases of the signals on respective connections, 44b, 46a, which both should have the same propagation uncertainties. Accordingly, the phase detector 26 can make an accurate comparison and accurately control the voltage for the VCO 23 so that an accurate dot clock signal on connection 18' is generated. The dot clock signal on connection 18' is then utilized to clock the ADC 14 and a high precision digital pixel data 15 is realized.

Figure 3:
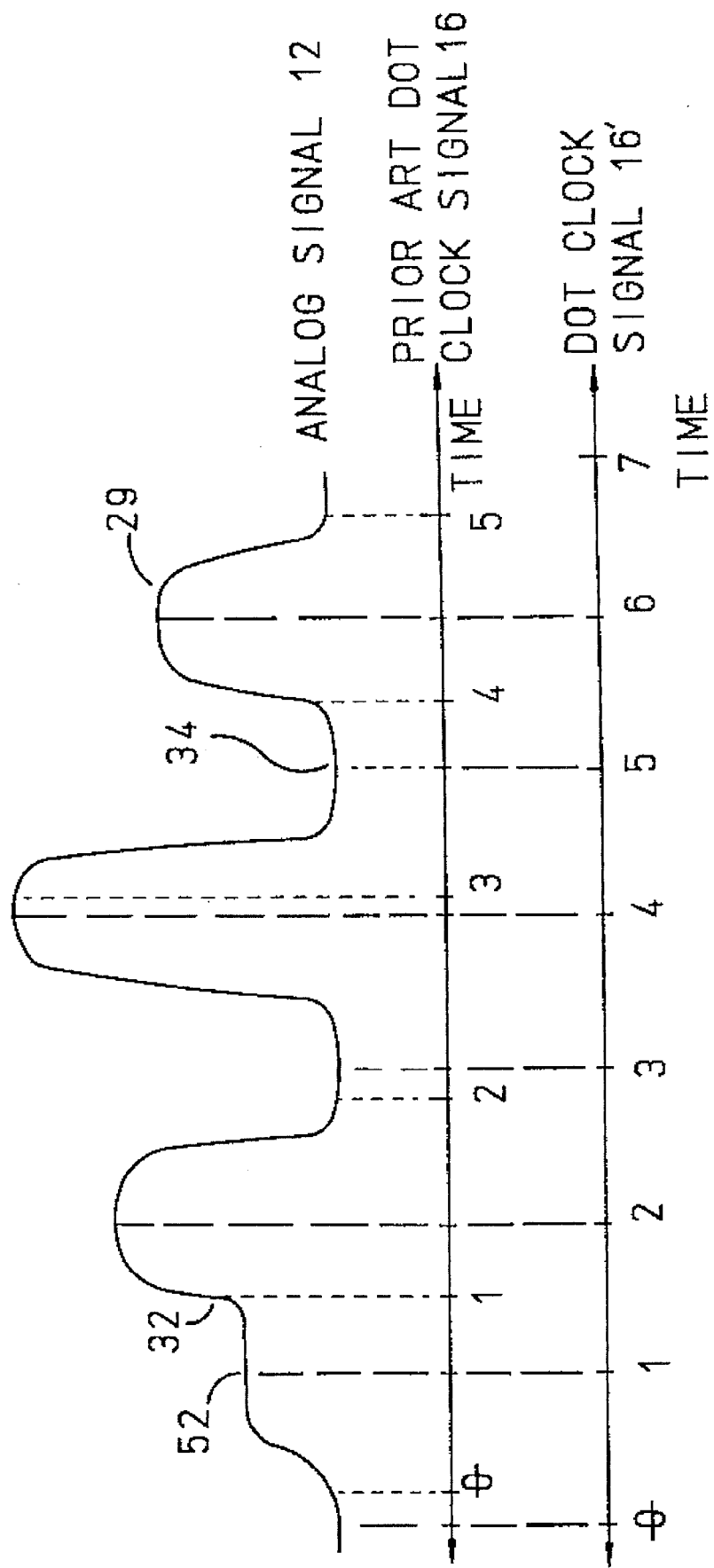
FIG. 3 is a graph which compares the sampling of analog video data of FIG. 1 by the prior art dot clock generation system of FIG. 2 with a novel dot clock generation system of the present invention.

As a result of the novel dot clock generation system 30, the ADC 14 accurately samples the analog data signal 12 within the analog video signal 11 as is illustrated in FIG. 3 at reference numeral 52. With reference to FIG. 3, the ADC 14 using the more accurate dot clock 18' samples the analog data signal 12 at slightly past the midpoint of each level region 29. Just past the midpoint is optimum because of the rising and falling edges of the analog data signal 12. As is apparent from FIG. 3, there is a one-to-one correspondence between the level regions 29 and the dot clock edges (as well as digital codes in the digital pixel data 15).

It should be noted that many variations and modifications can be made to the embodiment described here and before without substantially departing from the spirited scope of the present invention. It is intended that all such variations and modifications are included herein and within the scope of the present invention, as is set forth in the following claims.

We claim:

1. A system for generating a dot clock signal for pixels from an analog video signal using a phase locked loop, comprising:

a variable frequency oscillator configured to generate said dot clock signal;

a dot clock synchronization generator for counting cycles of said dot clock signal and for generating a dot clock synchronization signal;

a first buffer configured to compare said analog video signal to a reference voltage for identifying synchronization level within said analog video signal, said first buffer configured to generate an analog video synchronization signal indicative of occurrences of said synchronization levels, said first buffer configured to introduce a particular propagation time delay into said analog video synchronization signal;

a second buffer configured to receive said dot clock synchronization signal and configured to introduce said particular propagation time delay into said dot clock synchronization signal;

a phase detector for comparing phases corresponding with said analog video synchronization signal and said dot clock synchronization signal and for generating an oscillator control signal for said oscillator based upon said comparison of said phases a first storage element for communicating said analog video synchronization signal from said first buffer to said phase detector; and a second storage element for communicating said dot clock synchronization signal from said oscillator to said second buffer, wherein said first and second storage elements are each configured to introduce a certain propagation time delay which is substantially the same.

2. The system of claim 1, further comprising a delay element for delaying said dot clock synchronization signal prior to entry into said second buffer.

3. The system of claim 1, wherein said first and second storage elements are disposed in close proximity on the same substrate within a single integrated circuit.

4. The system of claim 1, wherein:

said first and second storage elements are clocked by said dot clock signal;

said analog video synchronization signal is passed through said first storage element asynchronously with respect to said dot clock signal; and said dot clock synchronization signal is passed through said second storage element synchronously with respect to said dot clock signal.

5. The system of claim 4, wherein:

said first and second storage elements are flip-flop mechanisms having data, reset, and clock inputs and data and inverse data outputs;

said data input of said first storage element being connected to a logic lift, said reset input of said first storage element being connected to said first buffer for receiving said analog video synchronization signal, said inverse data output of said first storage element being connected to said phase detector; and said data input of said second storage element being connected to said dot clock synchronization generator for receiving said dot clock synchronization signal, said reset input of said second storage element being connected to ground, said data output of said second storage element being connected to said second buffer for communicating said dot clock synchronization signal.

6. A method for generating a dot clock signal for pixels from an analog video signal using a phase locked loop, comprising the steps of:

generating the dot clock signal with an oscillator;

generating a dot clock synchronization signal from said dot clock signal;

passing the analog video signal through a differential buffer to generate an analog video synchronization signal having a particular propagation time delay;

introducing said particular propagation time delay in said dot clock synchronization signal by passing said dot clock synchronization signal through another buffer;

comparing phases corresponding with said analog video synchronization signal and said dot clock synchronization signal after said particular time delay has been introduced in order to generate an oscillator control signal;

controlling said oscillator with said oscillator control signal so that said phases converge toward one another;

passing said dot clock synchronization signal through a second storage element prior to passing said dot clock synchronization signal through another buffer;

passing said analog video synchronization signal through a first storage element; and introducing similar propagation time delays in said dot analog video synchronization signal and said clock synchronization signal with said first and second storage elements.

7. The method of claim 6, further comprising the steps of:

passing said analog video synchronization signal through said first storage element asynchronously with respect to said dot clock signal; and passing said dot clock synchronization signal through said second storage element synchronously with respect to said dot clock signal.

* * * * *